No. 816,802.   PATENTED APR. 3, 1906.
C. M. KERR.
RAILROAD SPIKE.
APPLICATION FILED APR. 19, 1905.
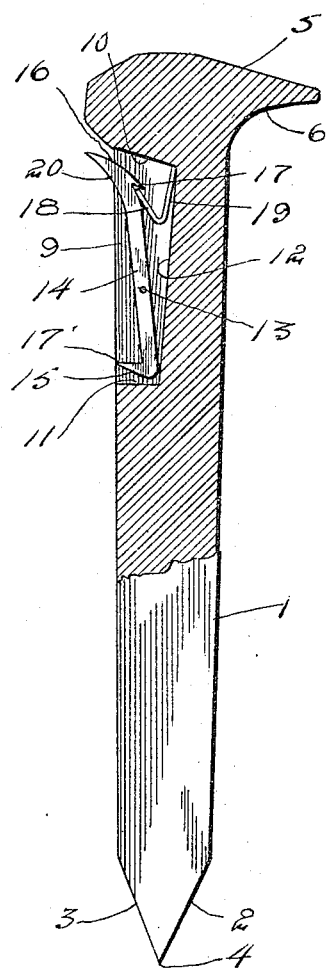
Fig. I.
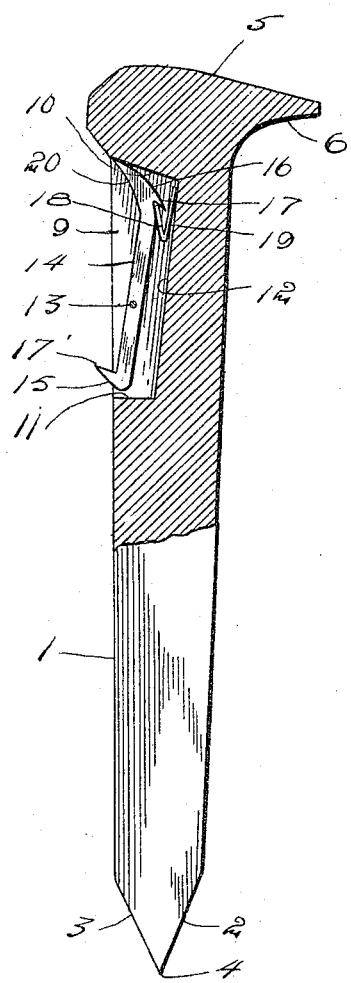
Fig. 2.
Witnesses
J. C. Simpson
E. M. Colford
Inventor
Charles M. Kerr
By Chandler & Chandler
Attorneys

UNITED STATES PATENT OFFICE.

CHARLES M. KERR, OF IDAHO FALLS, IDAHO.

RAILROAD-SPIKE.

No. 816,802. Specification of Letters Patent. Patented April 3, 1906.

Application filed April 19, 1905. Serial No. 256,347.

*To all whom it may concern:*

Be it known that I, CHARLES M. KERR, a citizen of the United States, residing at Idaho Falls, in the county of Bingham, State of Idaho, have invented certain new and useful Improvements in Railroad-Spikes; and I do hereby declare the following to be a full, clear, and exact description of the invention, such as will enable others skilled in the art to which it appertains to make and use the same.

This invention relates to spikes, and has for one of its objects to provide a simple, inexpensive, durable, and efficient spike for positively locking the spike in position with a tie and rail or other elements.

Another object of the invention resides in the provision of a spike wherein a pivoted locking member is associated therewith.

A still further object of the invention is to provide a spike having a pivoted member working within the shank portion thereof with an exerting means contacting with the said member.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the present invention.

In the drawings, Figure 1 is a side elevation of the spike, partly in section, showing the position of the locking member when the spike is not in use. Fig. 2 is a view similar to Fig. 1, showing the position of the pawl when the spike is driven home.

Referring now more particularly to the accompanying drawings, the reference character 1 designates the body or shank portion of the spike having its lower front and rear walls converging, as at 2 and 3, to a sharp edge 4 with its upper end provided with a head 5, from which and over the front face 2 projects a lip 6, having its under face beveled, as shown.

Formed in the rear of the shank or body portion 1, immediately beneath the head 5, is a recess 9, whose upper and lower walls 10 and 11, respectively, are parallel one with the other, the upper wall 10 being of greater length than the lower wall 11, the rear wall 12 of the recess being inclined upwardly, as shown.

Piercing the sides of the shank 1, midway of the front and rear of the recess 9 and nearer the bottom than the top thereof, is a fixed pin 13, upon which is pivotally mounted a dog or other member 14, having a hook 15 at its lower end, with its upper end bent upwardly and forwardly, forming a head 16, whose back is provided with a notch 17 for the reception of the free end of one leaf 18 of a V-shaped spring, whose other leaf 19 is of greater length and has its free end engaged in the upper rear corner of the recess 9, as clearly shown in the drawings. It will be observed that while the upper edge of the head portion 16 of the dog 14 is curved from front to rear the forward end thereof is not pointed; but the under face of the hook portion 15 is curved upwardly toward the upper edge thereof, terminating in a point or sharp edge 17.

By reason of the V-shaped spring contacting with the upper end of the dog 14, as set forth, the lower end of the latter is held normally within the recess when the spike is not in use, the upper end thereof being thrown outwardly from the recess by the normal action of the said spring. The dog or other member 14 continues in this position and does not move when the spike is being driven into the tie or the like until the last two or three blows of the hammer upon the head of the spike. In other words, when the spike has been driven nearly home the under forward face 20 of the head portion of the dog 14 being brought into contact with the upper surface of the tie is gradually forced inwardly into the recess, the dog moving upon its pivot 13 against the action of spring, causing the lower hooked end of the dog to be thrown outwardly from the recess and bite into the tie beneath the surface thereof. It will thus be seen that as the lip 6 of the head 5 of the spike is about to engage over the flange of the rail the sharp edge or pointed end of the hook begins to bite into the interior of the tie or the like and that by the time the lip is seated the hooked end of the dog has taken such engagement with the tie as to positively prevent accidental withdrawal of the spike therefrom.

What is claimed is—

1. A spike having a recess formed in one longitudinal face thereof, a dog pivoted in said recess with its upper end normally projecting therefrom, and its lower end normally within the recess, said lower end of the dog terminating in an outwardly-directed hook, and a spring arranged to hold the dog yieldably in normal position, said dog being pivotally movable to throw its hook end from the recess when subjected to pressure against the end face of its upper normally projected end.

2. A spike having its shank provided with a recess, a dog pivotally mounted in the recess and having a hook at its lower end and a head at its upper end, the rear of the dog having a notch formed therein immediately beneath its head portion, and a spring contacting with the said notch and the rear wall of the recess to hold the upper end of the dog normally out of the recess with the end of the latter therein.

In testimony whereof I affix my signature in presence of two witnesses.

CHARLES M. KERR.

Witnesses:
 E. M. HOLDEN,
 THOS. KERR.